(12) United States Patent
Hjertstedt

(10) Patent No.: US 11,416,957 B2
(45) Date of Patent: Aug. 16, 2022

(54) CONTRACT FORMATION, MANAGEMENT, AND PAYMENT PLATFORM

(71) Applicant: Henrik Hjertstedt, Zurich (CH)

(72) Inventor: Henrik Hjertstedt, Zurich (CH)

( * ) Notice: Subject to any disclaimer, the term of this patent is extended or adjusted under 35 U.S.C. 154(b) by 143 days.

(21) Appl. No.: 16/950,763

(22) Filed: Nov. 17, 2020

(65) Prior Publication Data
US 2021/0150653 A1 May 20, 2021

Related U.S. Application Data

(60) Provisional application No. 62/936,979, filed on Nov. 18, 2019.

(51) Int. Cl.
*G06Q 50/18* (2012.01)
*G06F 40/166* (2020.01)

(52) U.S. Cl.
CPC ......... *G06Q 50/188* (2013.01); *G06F 40/166* (2020.01)

(58) Field of Classification Search
CPC .................................................. G06Q 50/188
See application file for complete search history.

(56) References Cited

U.S. PATENT DOCUMENTS

2002/0129056 A1* 9/2002 Conant et al. .......... G06F 15/00

* cited by examiner

*Primary Examiner* — James J Debrow
(74) *Attorney, Agent, or Firm* — Whitley Legal Group, P.C.; AnnMarie W. Whitley

(57) ABSTRACT

A contract formation, management, and payment platform includes a method for negotiation and implementing smart contracts for the purchase and payment of goods and services. Parties can negotiate through a template and automatic negotiation or through features that compare competing contracts and positions to find agreeable positions and create best fit negotiated agreements using natural language processing, machine translation, and a library of legal content. Incoming proposed contracts or comments are serialized and then compared to each other and to a clause library, and agreeable negotiated positions are determined. Once all agreeable negotiated clauses are determined, then they are assembled into a new best fit negotiated agreement that parties can be prompted to review, accept, reject, or set aside the new agreement for manual review. Platform providers can license modules, charge users a fee for each transaction, and receive commissions for products and services sold within the platform.

20 Claims, 12 Drawing Sheets

CONTRACT FORMATION, MANAGEMENT, AND PAYMENT PLATFORM

CROSS-REFERENCE TO RELATED APPLICATIONS

This application claims the benefit of co-pending provisional U.S. Application 62/936,979 filed Nov. 18, 2019.

FIELD OF INVENTION

This invention relates to contract management. More particularly, this invention relates to a method of negotiating, forming, and implementing smart contracts for purchasing and payment of goods and services.

BACKGROUND

Businesses range from one-person enterprises to large global corporations and can be for-profit with an avowed purpose of making money for shareholders or not-for-profit with the purpose of trying to improve the world. While businesses vary in size or purpose, all are the main economic engine for the country and important vehicles for the exchange of goods and services. To facilitate the exchange of goods and services, most businesses prefer to a follow standard procurement procedure, which typically involves using purchase orders to clarify price, keep track of orders, manage payment, and provide legal documentation.

The procurement cycle for obtaining goods and services is widely known to involve several specific steps. For example, after recognizing a specific business need, and determining from whom to obtain the desired product or service, a purchaser will negotiate the best terms and then contract with the seller according to the negotiated terms. Typically, at this point, a purchase order is prepared that defines the price, specifications, terms and conditions, and additional obligations related to the purchase of the goods or services. The purchase order is delivered to the seller, often by facsimile, mail, in person, or through electronic mail. Upon receiving the purchase order, the seller acknowledges receipt, and both parties maintain copies. The seller then fulfills the order, working to ensure delivery and completion that satisfies the agreed upon timeline.

Upon receipt of goods or services, the purchaser will accept or reject the seller's performance, such as accepting or rejecting the delivered goods. Once the goods or services are accepted, the purchaser pays for the goods or services. First, however, to confirm that both the purchaser and seller are satisfied, usually three documents must match: the payment invoice, the receiving document, and the original purchase order. If the three do not match, then any discrepancies must be resolved before payment is required. A purchaser usually pays the seller with cash, check, bank transfer, credit letters, or other types of electronic transfers. Both the purchaser and seller may want or need to keep records such as purchase records to verify any tax information, purchase orders to confirm warranty information, purchase records referencing future purchases, and any other documents necessary to satisfy auditing requirements.

Because of the steps and documentation involved, contracts for purchasing and paying for goods and services typically require several administrators between the buyer and seller. It would be desirable to provide a platform that automates, simplifies, and reduces costs related to creating vendors in financial systems, creating contracts, and processing payments. It would be further desirable to provide a platform that simplifies contract negotiation to facilitate compromise acceptable to opposing parties.

SUMMARY OF THE INVENTION

A contract formation, management, and payment platform includes a method for negotiation and implementing smart contracts for the purchase and payment of goods and services. The platform provides a convenient method for businesses to contract with other businesses and for businesses to set up automatic payments with individual customers. Key features of the platform include a method of providing verified vendor data in structured form, contracts with industry default or customizable terms, a set of rules for confirming contract terms have been satisfied, and automatic payments once contract performance has been verified. The platform uses a series of connected modules to organize the various activities for its clients. By centrally managing purchases across the globe and facilitating payment without involving banks, businesses will be able to expand their reach and economize their costs.

The contract formation module of the platform facilitates contract negotiation between parties, either through a template and automatic negotiation or through features that compare competing contracts and positions to find agreeable positions and create best fit negotiated agreements using natural language processing, machine translation, and a library of legal content. Incoming proposed contracts or comments are serialized and then compared to each other and to a clause library. Proposed contracts can be solicited or unsolicited, and comments can be restricted to a predetermined set of comments or unrestricted such that they might be replacement clause or contract sections. After the contract and comment clauses are serialized, where they overlap, the position of each party to the negotiation is evaluated against the other and against an optional set of parameters set by each party to determine whether a common position can be found and further to proposed an agreeable negotiated clause. Additionally and optionally, if either party requires or does not want a particular clause, they can elect to have the proposed contract reviewed for such clauses. Required clauses can be added and unwanted clauses can be removed. Once all agreeable negotiated clauses are determined and optionally any required or unwanted clauses added or removed, respectively, then they are assembled into a new best fit negotiated agreement is created. The parties can be prompted to review, accept, reject, or set aside the new agreement for manual review. Additionally and optionally, at any point during the negotiation either party can be prompted to accept or reject any agreeable negotiated clauses or other conditions can be set to trigger manual review by the parties. The contract formation module of the platform is particularly useful where two parties agree to use a template and submit playbooks summarizing their preferences and positions for each clause. Through an automatic negotiation feature, a best fit negotiated agreement can be formed after analyzing the competing playbooks and determining agreeable negotiated positions for each clause in the template. The parties can elect to have the contract formed and entered automatically or may require final approval after the contract is formed. By using the contract formation module, opposing parties to a contract can reduce negotiation time by finding common ground and possibly by automating the entire contract formation process, which is useful for the legal industry, finance industry, and any international business department.

The contract platform can be monetized by the platform provider by providing the platform to businesses and charging a fee for each transaction, licensing access to advanced modules, receiving a commission for third party products and services sold within the platform, charging interest on money stored on a bank account that backs the cryptocurrency tokens, and selling data associated with the platform.

DETAILED DESCRIPTION OF THE INVENTION

A contract formation, management, and payment platform 10 for use by businesses, organizations, and consumers provides a centralized source for maintaining company details, creating standard and customizable industry contracts, facilitating contract performance, facilitating payment, and facilitating reporting.

Figure 1:
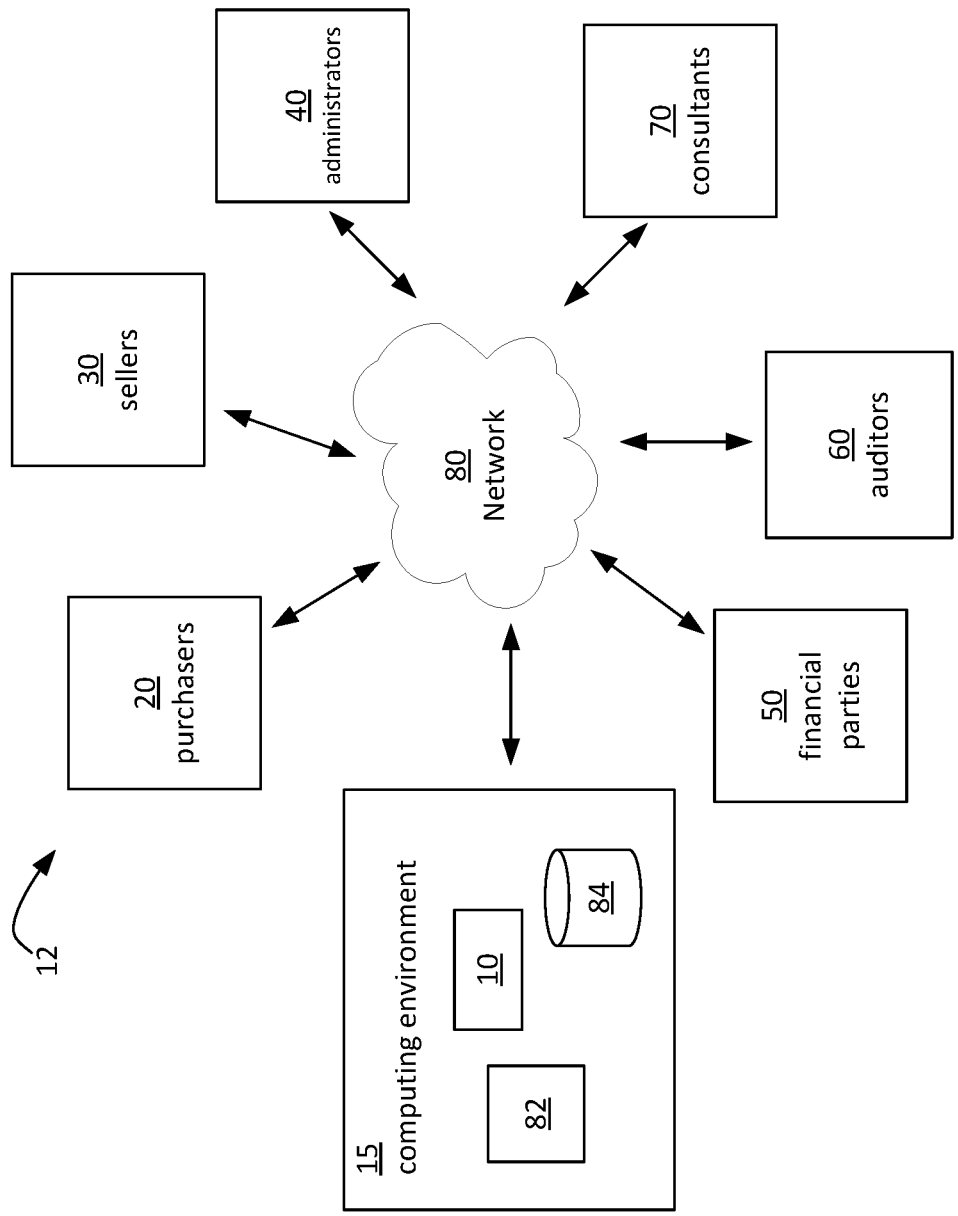
FIG. 1 is an illustration of the platform as a cloud-based platform accessible by several clients.

FIG. 1 illustrates a networked environment 12 for accessing, forming, managing, and otherwise using the components and modules of platform 10 according to the various embodiments of the present disclosure. Platform 10 is accessibly by clients, and the networked environment 12 includes client devices for purchasers 20, sellers 30, administrators 40, financial parties 50, auditors 60, consultants 70, and other individuals or entities needing access to platform 10 to oversee, report, initiate, or execute contracts and related activities. Networked environment 12 also includes a computing environment 15 supporting platform 10, including typical computer hardware components and one or more software programs that are housed together or in pieces on individual computers connected through the cloud or over a network 80. For example, platform 10 can be located on or among individual computers in computing environment 15, the individual computers each having a processing unit and data storage unit that are owned by, or located at, individual businesses that communicate with each other or a centralized cloud-based database over the internet. Preferably, however, platform 10 is a cloud-based platform where the clients connect to the computing environment 15 and platform 10 through network 80, and computing environment 15 comprises at least a processing unit 82 and data storage unit 84, both of which are accessible to the clients from remote locations via their networked client devices. Computing environment 15 may have one computer or it may include a plurality of processing units that work together. Likewise, while only one network 80 is shown in FIG. 1, network 80 may include multiple smaller networks that work together. The system can collect, store, and retrieve data for multiple clients, multiple systems within a single client, as well as multiple systems located within multiple clients.

In addition to purchasers 20, sellers 30, administrators 40, financial parties 50, auditors 60, and consultants 70, clients also refers to site or operational locations that are in communication with computing environment 15 and platform 10 over network 80. Clients are capable of accessing both the processing unit 82 and storage unit 84 that are located in the computing environment 15 and are able to access both local processes as well as information from the computing environment 15 and platform 10. Software necessary for all aspects of using and operating platform 10 is preferably located in the computing environment 15 and accessed remotely by the clients. The clients preferably communicate with the computing environment 15 through any secured or unsecured method including Hypertext Transfer Protocol Secure (HTTPS), secure telnet, or file transfer protocol secure (FTPS). Secured methods are preferred, and the particular method chosen will depend on the requirements of the function being accessed. Those skilled in the art will understand that using platform 10 and computing platform 15 is not limited to any particular protocol or method of transferring data.

Figure 2:
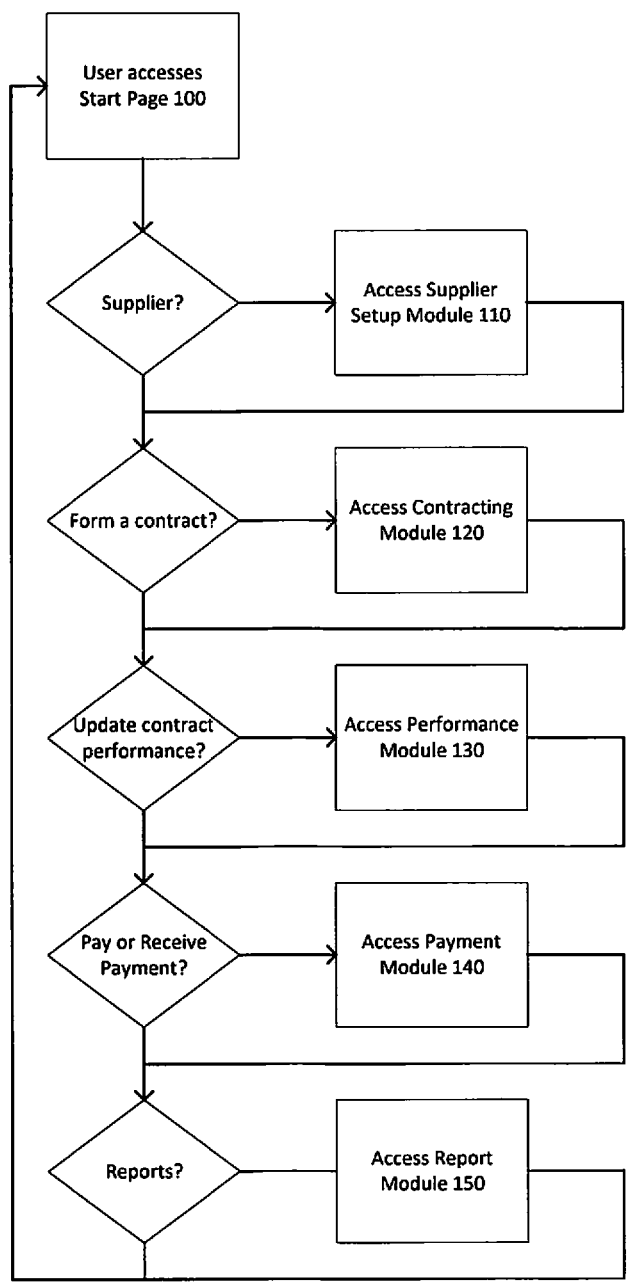
FIG. 2 is a flowchart of the main functions available through the platform of the present invention.

As shown in FIG. 2, platform 10 provides a variety of choices for those using it. First, a client accesses platform 10 at preferably a start page 100. The term clients includes all users, individuals, specified employees or representatives from companies, or companies as a whole. From start page 100, the client selects a module to use. Modules include a supplier module 110, a contracting module 120, a performance module 130, a payment module 140, or a reporting module 150. While modules are listed independently here, some features within each module are accessible from or linked between modules 110, 120, 130, 140, and 150. Additionally, the modules may be divided or additional modules may be added as needed for quicker access from start page 100. After selecting a module from start page 100, the client is taken or directed to the module to access its features.

Figure 3:
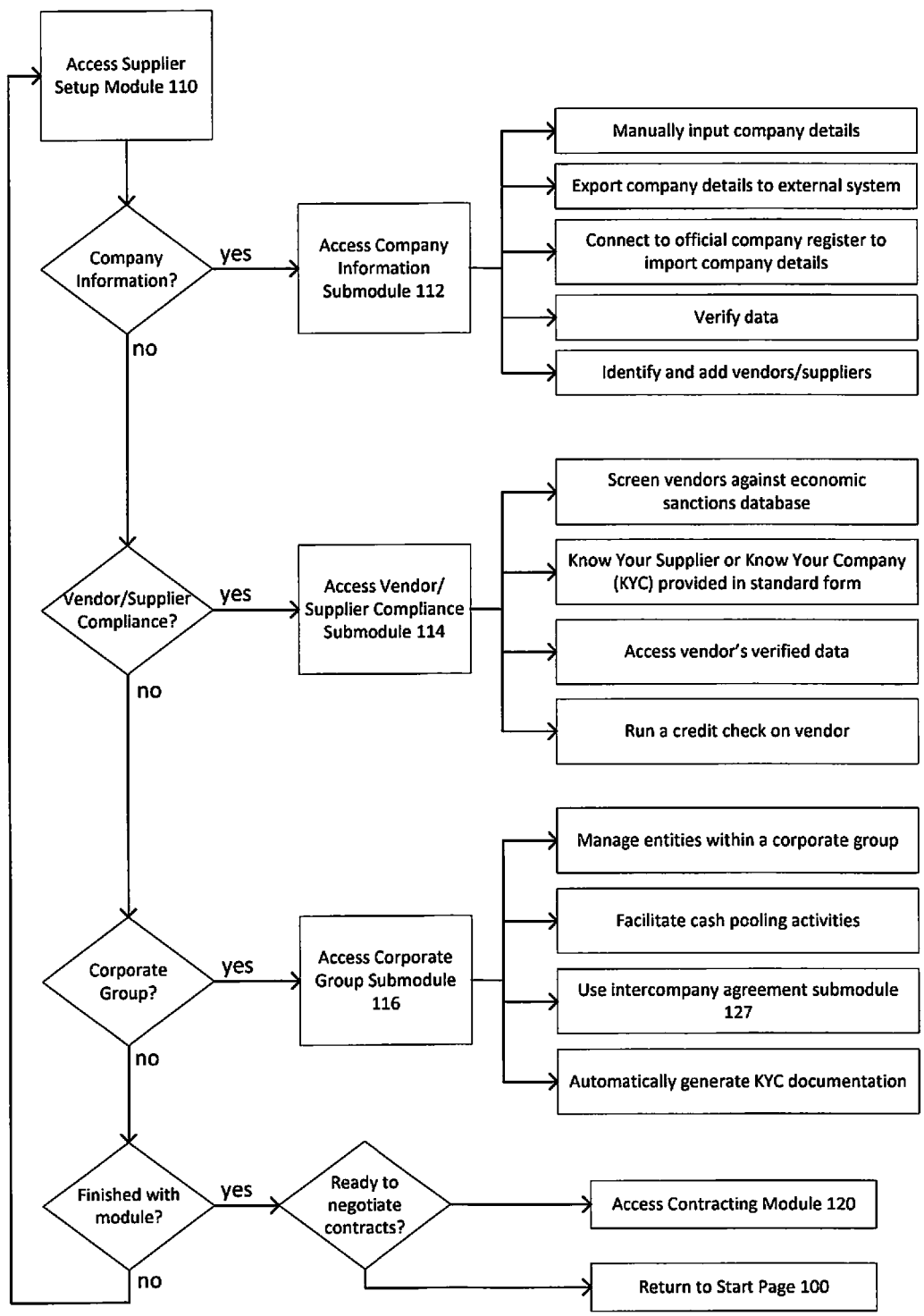
FIG. 3 is a flowchart of the supplier setup module of the platform of the present invention.
Figure 4:
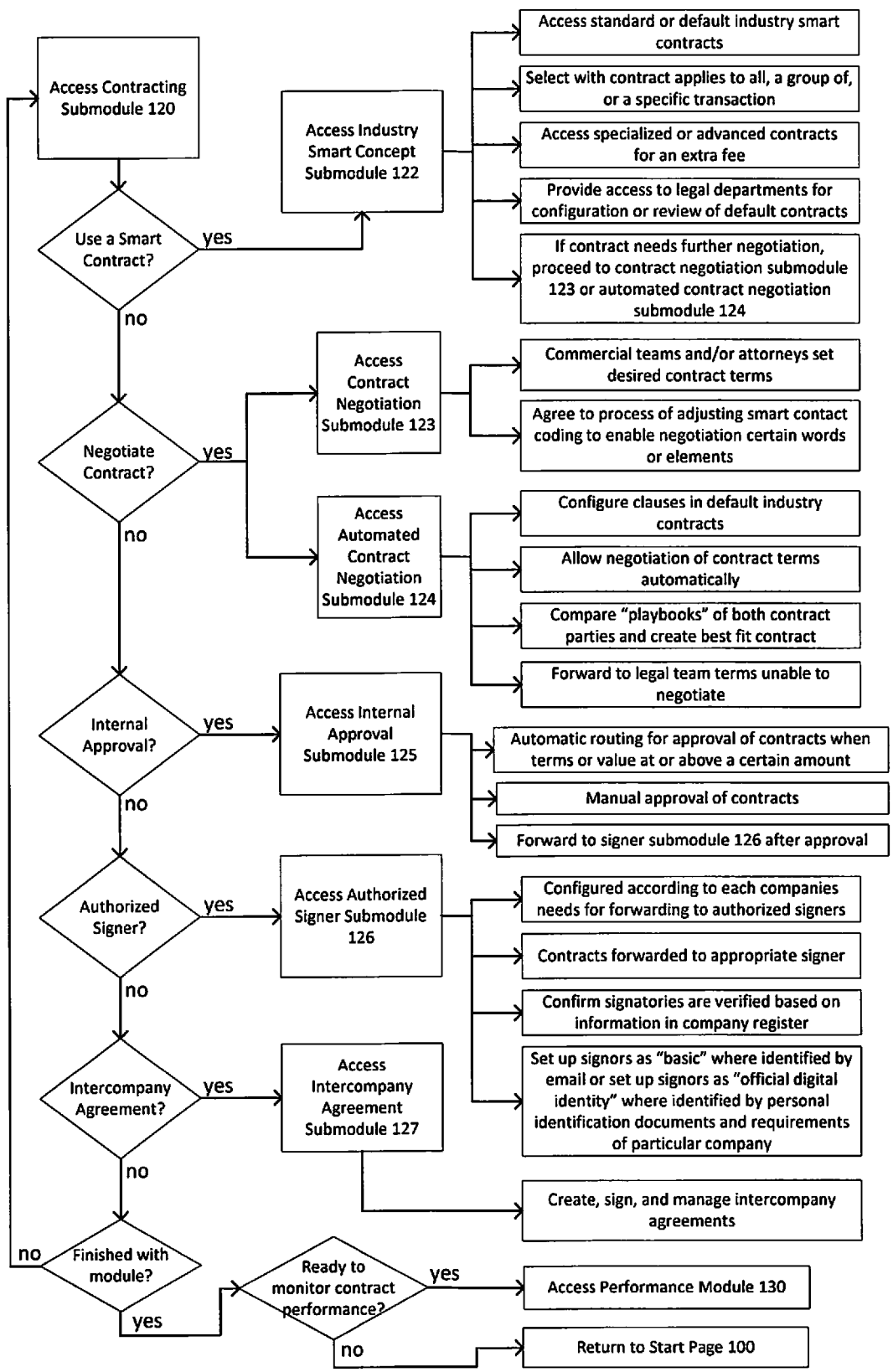
FIG. 4 is a flowchart of the contracting module of the platform of the present invention.

FIG. 3 illustrates the features that may be available in the supplier module 110. Preferably, when accessing supplier module 110, the client next must select a supplier submodules. Supplier submodules include a company information submodule 112, a vendor compliance submodule 114, and a corporate group submodule 116.

Within the company information submodule 112, the client can set up company details required for successful operation of platform 10. Preferably, the company details are those used throughout platform 10 and include those that parties to transactions would like access to without having to enter or search further for the details. Company information submodule 112 further preferably includes export functionality so that clients can export information to external systems as needed. Additionally, company information module 112 can connect to official company registers or databases to import information needed by platform 10. Optionally, the information can automatically be directly exported to external systems or imported from registers and databases as needed. Preferably, company information submodule 112 includes options to verify data imported or input when a company enters new data.

Vendor compliance submodule 114 includes several options for clients using supplier module 110 who wish to verify vendors. For example, platform 10 can compare company information for a vendor against an economic sanctions database. Additionally, a client can know that information is provided in standard form or that Know Your Customer (KYC) information standardized. Platform 10, after verifying company information, can designate a verified status for companies, such as "Verified by Company Register." Optionally, within vendor compliance submodule 114, clients can use platform 10 to run credit checks on vendors. Preferably when running credit checks, specialized firms connect to platform 10 specifically for running credit checks.

Corporate group submodule 116 allows the management of all entities within a corporate group to facilitate management of enterprise details. Additionally, corporate group submodule 116 facilitates cash pooling activities, enables use of an inter-company agreement submodule, and automatically generates KYC documentation.

FIGS. 4 and 8-13 illustrates the features that may be available in contracting module 120. Contracting module 120 preferably includes at least a smart contract submodule 122, a contract negotiation submodule 123, an automated contract negotiation submodule 124, an internal approval submodule 125, an authorized signatory submodule 126, and an intercompany agreement submodule 127. Contracting module 120 preferably includes agreement templates 300 and a standard clause library 320 stored on the computing platform 15 that can be used to generate, analyze, or modify contracts submitted by parties using platform 10. Agreement templates 300 can be any type of standard agreement used by multiple parties such as pre-negotiation agreements, non-disclosure agreements, sale and purchase of goods, sale and purchase of services, manufacturing agreements, industry specific templates including those created by industry associations such as the International Chamber of Commerce, the International Federation of Consulting Engineers, real estate agreements, and any other agreement capable of being reduced to a template format. Standard clause library 320 can be typical clauses used by the templates and common for other types of contracts, including standard legal terminology and clauses standard in the legal industry. Preferably standard clause library 320 includes sets of clauses for each type of contract and optionally individual clauses that can be used in many different agreements such as confidentiality clauses and notice clauses. Also optionally, standard clause library 320 includes common acceptable terms for some or all of the clauses.

Within the contracting module 120, clients can use platform 10 to engage in transaction that are settled according to industry standards and customary terms. For example, clients can select a smart contract from smart contract submodule 122 to apply to all transactions, a group of transactions, or a specific transactions. Platform 10 preferably provides contract templates 300 for each industry and optionally industry smart contracts 310 where available. Advanced industry smart contracts 310 are preferably those provided by law firms or legal companies. Within contracting module 120, preferably legal departments also can access, configure, and review contracts selected by clients. Contracting module 120 also provides two options for contract negotiation, both of which take advantage of the standard clause library 320. For the following examples, clients are referred to as parties generally and Party A and Party B for the purpose of providing contract negotiation and formation examples.

The contracting module 120 preferably scans contracts and comments for keywords and custom parameters and uses natural language programming (NLP) to compare the similarity of competing contracts and comments. For example, using NLP, the text of a contract can be cleaned, reviewed for standard or customized stop words, reduced into common terms such as "warranty" for both "warranties" and "warranty" or into common stems such as "liab" for "liabilities" and "liability", and stripped of short words. For example, using NLP, clauses relating to "limitation of liability" can be found in an incoming agreement, and then analyzed against a base limitation of liability clause in the clause library. By serializing and reviewing the clause from the incoming agreement against the base clause in the library, information can be determined such as that the type of agreement (e.g., a Terms of Use for Website agreement), the type of clause (e.g., exclusion of liability for indirect loss clause), and how the clause differs from the base clause in the clause library. Additionally, from the review, a standard clause can be proposed, e.g. a clause for exclusion of lability for indirect loss, a pre-set playbook or preferred clause for a negotiated position can be found and proposed, or a best fit clause can be suggested.

Figure 8:
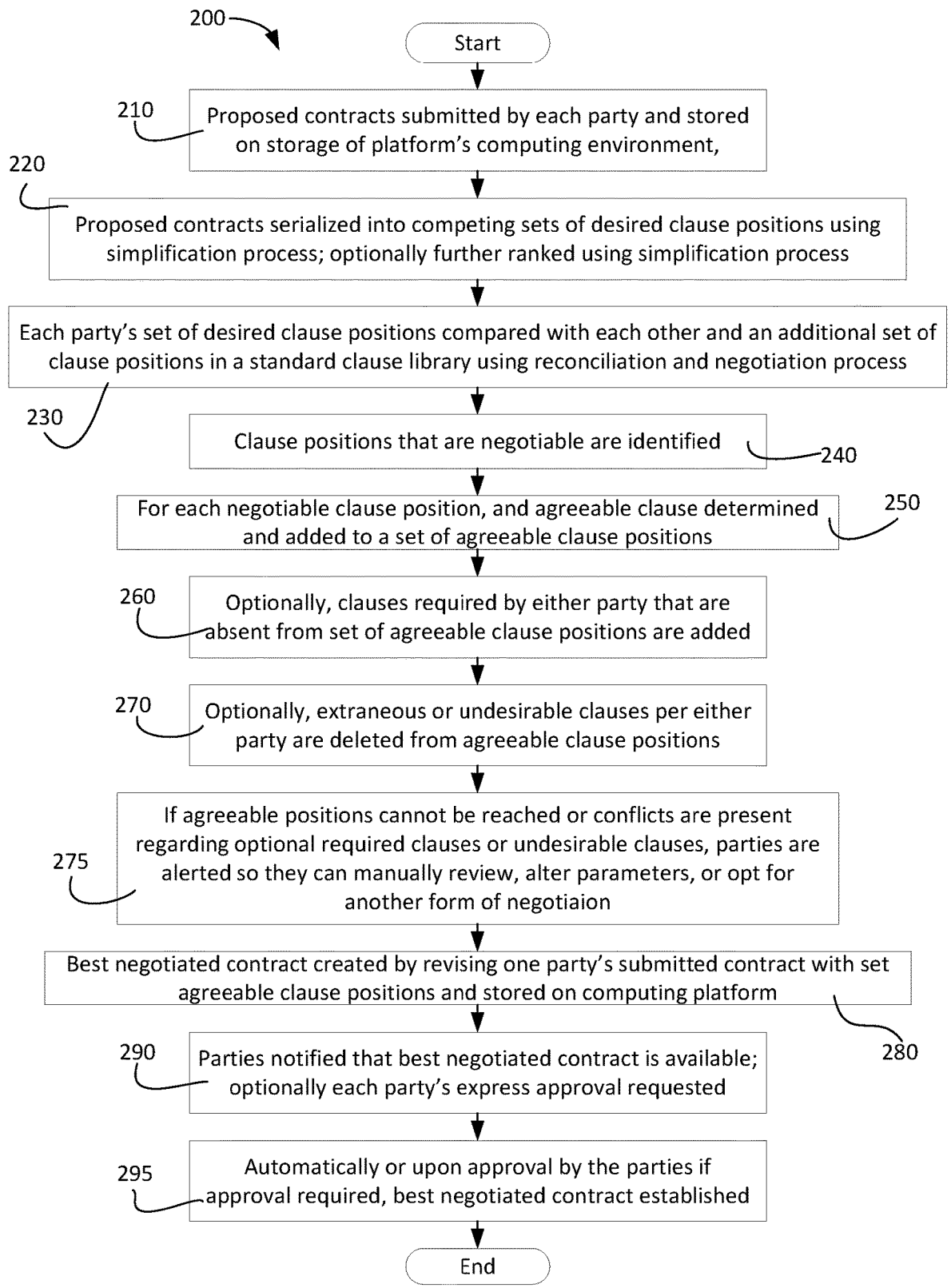
FIG. 8 is a flowchart illustrating how competing contracts and comments are received, reviewed, and revised to form best fit negotiated contracts according to the contract formation module of the present invention processes

FIG. 8 illustrates the general steps 400 to forming a contract with contracting module 120 using either the contract negotiation submodule 123 or automated contract negotiation submodule 124. As shown, one or both clients or parties submit 210 their desired contract clauses, comments, or playbooks for review and comparison. The platform stores each party's submission on the computing environment 15 for processing and review. If one party has a predetermined or defined set of desired contract clauses already stored on the computing environment, then only the other party needs to submit proposed contract clauses or comments. For processing, each party's submission is designated as a proposed contract even if the party's submission is only a set of comments or is an instruction to refer to a stored set of preferred contract clauses and positions.

Next, each party's submission undergoes simplification processing where the clauses of both parties are serialized 220 into a set of desired clause positions 370 for each party. Preferably, the simplification processing uses NLP and machine translation where necessary. Optionally, the simplification processing can rank the set of desired clause positions 370 according to a predetermined order of importance or by some other criteria. Each desired clause position of the set of desired clause positions 370 is the stated parameter for that clause to which a party is willing to accept and can be a single position or a range of acceptable positions.

Next, with a reconciliation and negotiation processing, the desired clause positions 370 of each party are compared 230 to a set of clause positions stored in a standard clause library 320 or, where appropriate, to a predetermined clause library 330 or a default playbook 340 of one of the parties, all of which are stored on the computed environment. The clause positions are compared for similarity and to identify 240 if any clause positions can be reconciled or negotiated between the parties. For the clause positions within the sets of desired clause positions 370 that are identified as negotiable, agreeable clauses 380 are determined 250 using a negotiation process without user interaction, and a new set of agreeable clause positions is created.

Next, with contract revision processing, one of the contracts submitted by the parties, for example Party A's proposed contract, is modified by replacing its serialized set of desired clause positions with the newly assembled agreeable clause positions to create a new best negotiated contract 280, which will also be stored on the storage associated with the computing environment 15. Once the best negotiated contract is created 280, then the parties are notified 290 that the contract has been formed and is available on the computing device. Preferably the parties are notified with an alert or push notification on their computing devices. Optionally, the parties are provided a copy of the best negotiated comment through a user interface, electronic mail, text messaging, or some other form of communication. Optionally, if one or more parties would like to review the modified proposed contract before accepting it, then each one or both of the party's approval is requested. Once approved, the best negotiated contract is established 295. These general steps can be used whether the parties are using a contract negotiation submodule 123 or automated contract negotiation submodule 124 within contracting module 120. Additionally, these general steps can be used for facilitating two party agreements or agreements between three or more parties.

Optionally, before contract revision processing, additional clauses can be added to or removed from the set of agreeable clause positions. For example, where at least one party has designated certain clauses are required, which are identified in a stored set of required clause positions 332, then after reconciling the set of agreeable clause positions with the set of required clause positions, any missing required clause positions can be added 260 to the set of agreeable clause positions. Similarly, where at least one party has designated certain clauses are undesirable or unnecessary, which are identified in a stored set of unwanted clause positions 334, then after reconciling the set of agreeable clause positions with the set of unwanted clause positions, any unwanted clause positions can be removed 270 from the set of agreeable clause positions.

During reconciliation and negotiation processing, if agreeable positions cannot be reached or there are any conflicting required or undesirable clauses present, then no proposed contract is formed and the parties preferably are notified or alerted 275 so that they can pursue manual review, alter any parameters, or opt for another form of contract negotiation. For example, if during reconciliation and negotiation processing, agreeable positions can be found for only ninety percent of the clauses, then no proposed contract is formed and the parties are alerted that negotiation failed. Optionally, the parties are further provided with details about what clauses were negotiable and agreeable and what clauses were roadblocks. With such information, the parties can decide whether the roadblock clauses are important or whether they wish to continue pursuing an agreement.

Figure 9:
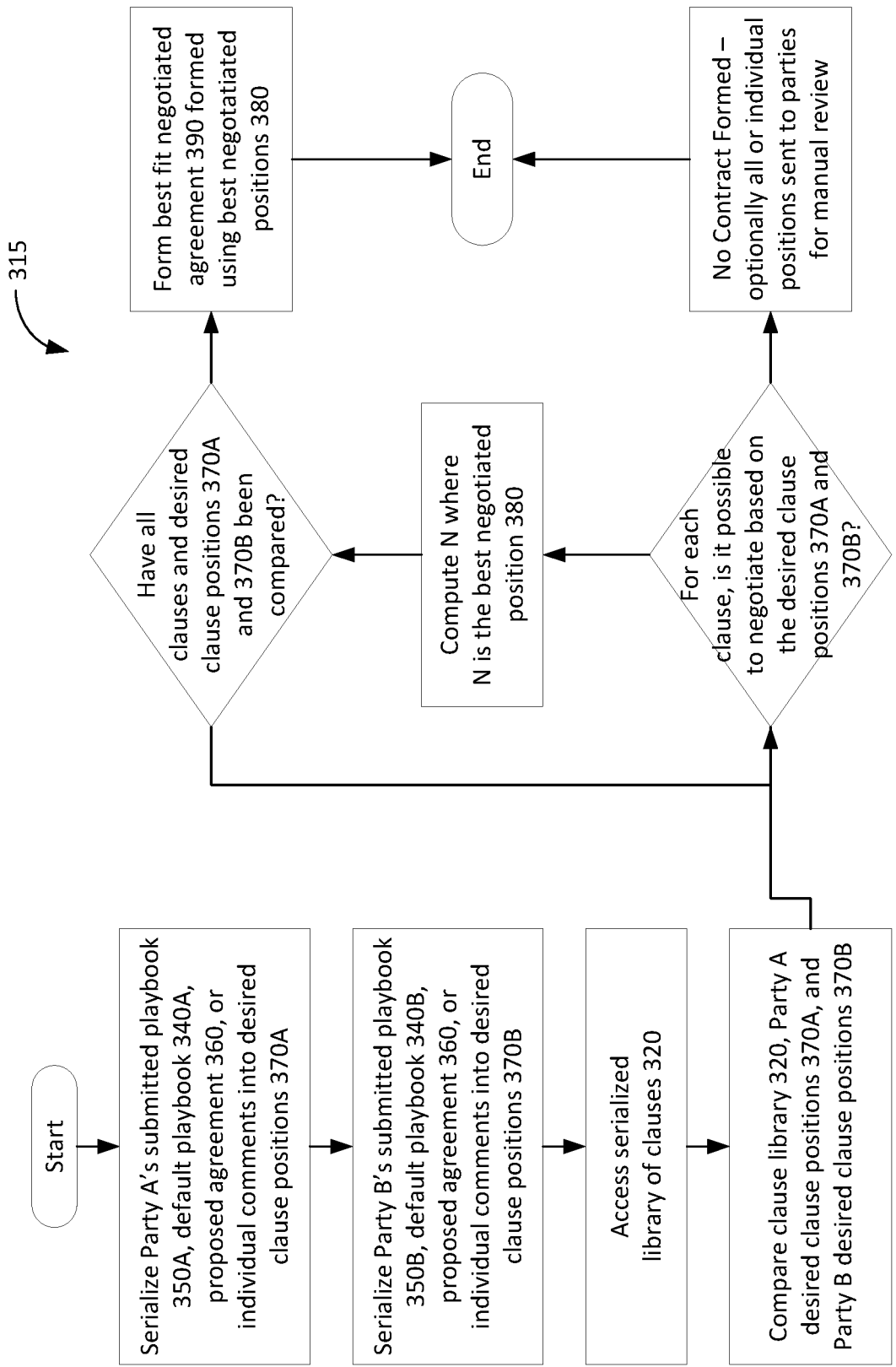
FIG. 9 is a flowchart illustrating how competing clauses are analyzed to find a best negotiated position according to the to the contract formation module of the present invention.

FIG. 9 further illustrates a clause analysis tool 315, which is the simplification process and reconciliation and negotiation process that generates a set of agreeable clauses. Clause analysis tool 315 can be used by both contract negotiation submodules 123 and 124. As shown, clause analysis tool 315 forms a best fit agreement 390 when two parties, Party A and Party B, each submit a playbook 350A and 350B, select a default playbook 340A and 340B, or propose an agreement 360A and 360B and use contracting module 120 to facilitate agreement automatically. It also applies when one party proposes a contract and the other party responds with comments, which are treated by clause analysis tool as a counteroffer. Clause analysis tool 315 also can be adapted to compare clauses of three or more parties. As shown, after each party has submitted a playbook 350A and 250B or agreement 360A and 360B or selected a default playbook 340A or 340B, their desired clause positions 370A and 370B are serialized and optionally ranked in order of importance, where order of importance can be set by the parties or an automated feature of contracting module 120. The desired clause positions 370A and 370B are then one-by-one compared, optionally according to their ranked order, first to see if a negotiated position N is possible and second, when possible, to negotiated an agreeable or best negotiated position 380. If a negotiated position N is determined not to be possible, then a contract is not formed automatically. Optionally, Party A and Party B can be sent information to facilitate manual review or to alter any individual desired clause positions 370A and 370B. If a negotiated position N is determined, then an agreeable or best negotiated clause 380 is set. After all of the clauses and desired clause positions 370A and 370B are compared so that for each clause there is a best negotiated clause 380 set, then the best negotiated clauses are assembled into a new best fit negotiated contract 390.

The negotiated position N can be determined in several ways. For example, in a standard industry smart contract, the possible variations available to parties is finite. Each clause option would include a risk factor (e.g., on a scales of 1-10) that depending on the clause chosen is allocated to either party. A party could preselect in their playbook that a particular clause could not include a risk factor higher than R (e.g., where $1 \leq R \leq 10$) and in total the agreement should not give a risk factor higher than Rn (e.g., where n+the number of clauses and $1 \leq R \leq 10$). In this way the pre-set agreement clauses can be allocated between the parties. In addition, certain clauses may be associated with an increase or decrease in money exchanged through the agreement. For example, if one party requires that a clause prohibiting subcontracting be included in the agreement, then the other party may require a 10% price increase. In such case the clause would be included but with a note that the agreement is accepted but based on an increase or decrease of price. For agreements not based on industry standards, the clause analysis tool 315 would choose a best fit from the library of available clauses that match the playbook parameters. Additional methods of arriving at a compromise position can be used as well such as weighted or unweighted averages, splitting the difference evenly between two positions, or other methods commonly used when negotiating an executing contracts.

Figure 10:
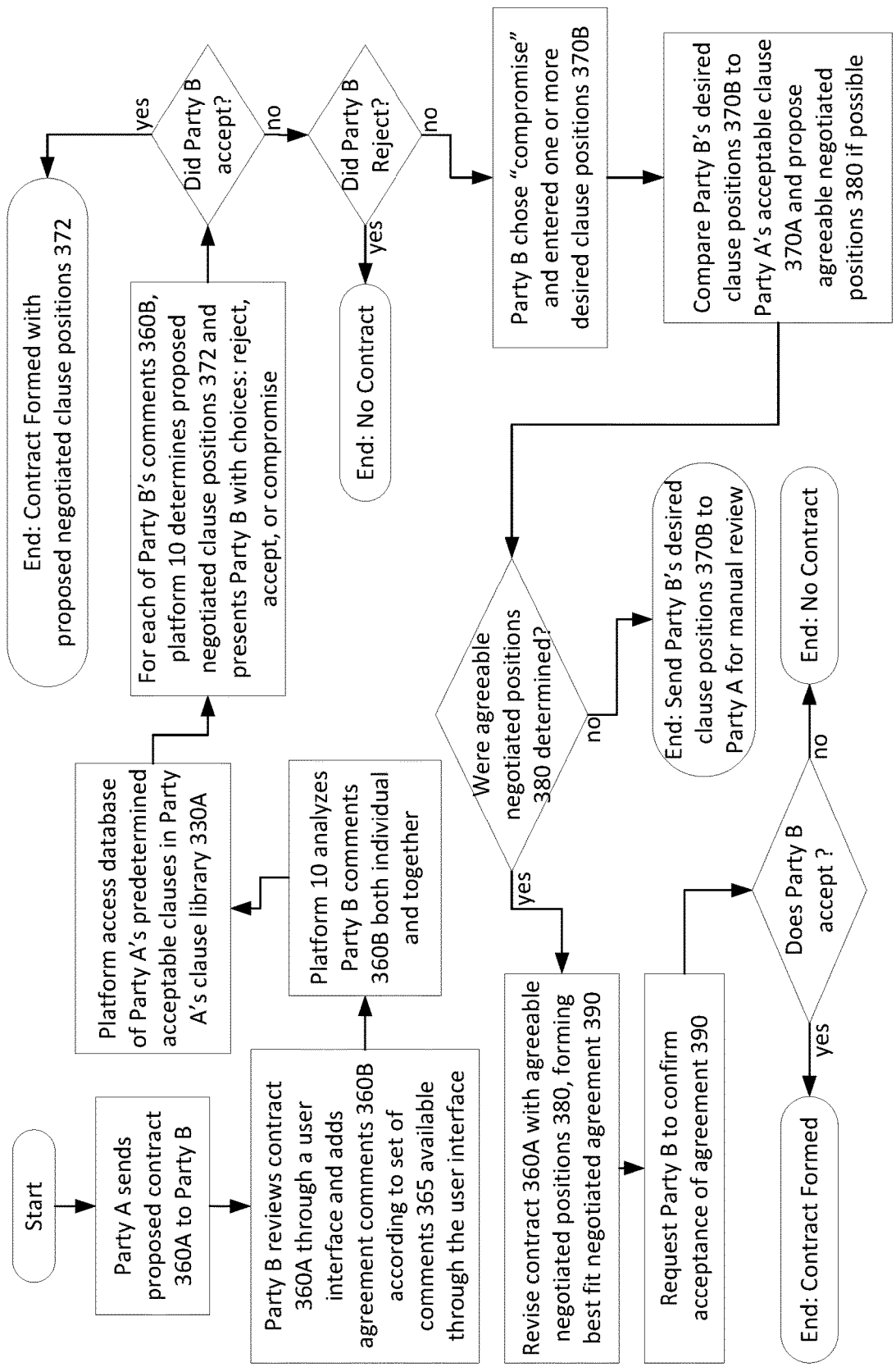
FIG. 10 is a flowchart illustrating a first scenario of two parties using the contract formation module of the present invention to negotiate and form a contract.

Contract negotiation submodule 123 provides a client with tools that allow a client commercial team or lawyers to negotiate contract terms within platform 10 based on a standard set of terms. Due to the nature of smart contracts, negotiating specific contract terms is preferably only allowed when a client agrees to a modified smart contract element or to configure the contract wording. The contract element or wording is preferably linked to specific code that will be adjusted based on the adjusted contract wording or element. FIG. 10 illustrates a contract negotiation scenario where a client, Party A, proposes a contract 360A to Party B, and Party B responds through a user interface that limits Party B to responding with comments 360B according to a set of comments 365 available through the user interface. For example, if Party A proposes a clause requiring that invoices be paid within sixty days, Party B might be given a set of comments for responding such as "agree", "agree with modification to ninety days with 10% surcharge after sixty days", or "disagree". After Party B selects from the provided comments, platform 10 analyzes Party B's comments 360B individually and collectively. Platform 10 accesses Party A's predetermined list of acceptable clause in an optional clause library 330A and analyzes Party B's comments against the clause positions in optional clause library 330A of Party A in the same manner as described with respect to clause analysis tool 315. Then, for each of Party B's comments 360B, platform 10 determines proposed first negotiated clause positions 372 and presents Party B with a set of choices. Preferably, the set of choices are "reject," "accept," or "compromise/manual entry." Party B can be provided with the set of choices for each individual clause that is modified or for the agreement overall. If Party B selects "accept" for all of the first negotiated clause positions 372, then a contract is formed. If Party B selects "reject" for any or all of the first negotiated clause positions, then no contract is formed and the parties can opt for manual review. If Party B selects "compromise/manual entry" for all or any of the negotiated clause positions 372, then platform 10 compares Party B's desired clause positions 370B, which it determines from Party B's entries and compares them to Party A's desired clause positions 370A as outlined in clause analysis tool 315. If agreeable negotiated positions were not found, then no contract is formed and Party A can optionally review Party B's desired clause positions 370B manually. If agreeable negotiated positions are determined, then contract 360A is revised accordingly and a new best fit negotiated agreement 390 is formed and proposed. New agreement 390 can next be transmitted to Party B for Party B to accept or not accept. If Party B accepts, contract 390 is entered.

Figure 11:
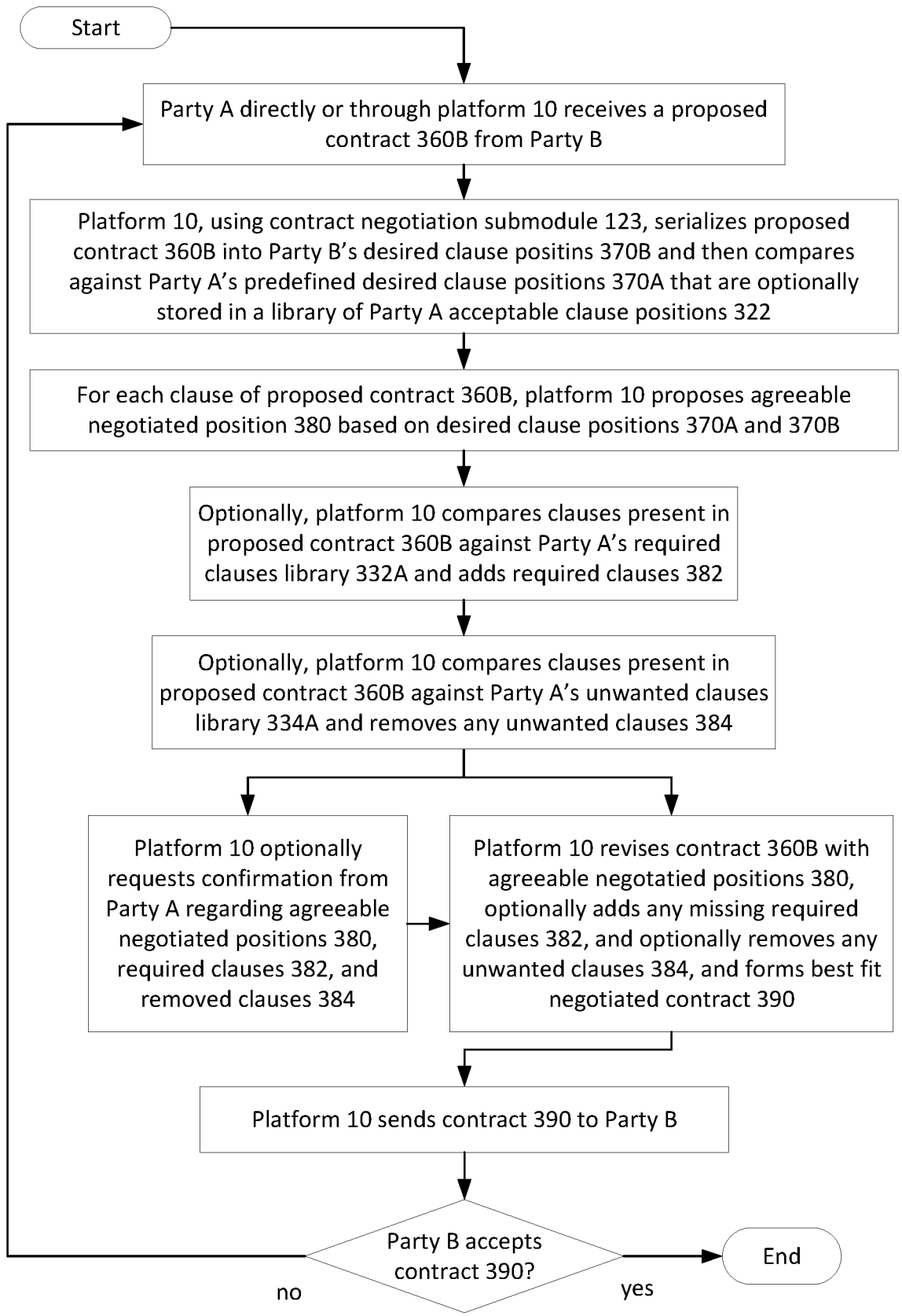
FIG. 11 is a flowchart illustrating a second scenario of two parties using the contract formation module of the present invention to negotiate and form a contract.

FIG. 11 illustrates another scenario falling within submodule 123 where a first client, Party A, receives a proposed contract 360B from a second party, Party B, who may also be a client with access to platform 10. Party A can submit the proposed contract 360B to platform 10 or have Party B submit the proposed contract 360B to platform 10 if Party B also is a client of platform 10. Upon receipt of the proposed contract 360B, platform 10 contract negotiation submodule 123 identifies key clauses of the proposed contract 360B and Party B clause positions of 370B. Next, it analyzes them against set clause positions 370A defined by Party A, which are optionally stored on platform 10 in a library of acceptable clause positions 322 of Party A. For each key clause of proposed contract 360B, platform 10 proposes agreeable negotiated positions 380 based on desired clause positions 370A and 370B and a calculation formed using clause analysis tool 315. Optionally, platform 10 also can compare the clauses in Party B's contract 360B to Party A's library 332A of required clauses 382. If any required clauses are absent from Party B's contract 360B, platform 10 can add them to the best fit negotiated contract 390 that will be formed and proposed. Also optionally, platform 10 can compare the clauses in Party B's contract 360B to Party A's library 334A of unwanted clauses 384. If any unwanted clauses are present in Party B's contract 360B, platform 10 can remove them from the best fit negotiated contract 390 that will be formed and proposed. After determining the agreeable negotiated positions 380 and optionally identifying any required clauses 382 and unwanted clauses 384, the platform 10 can optionally request confirmation from Party A with respect to any or all of the positions 380 and clauses 382 and 384. If Party A approves or if Party A's approval was not requested, then platform 10 revises contract 360B with the agreeable negotiated positions 380 and optionally adds any missing clauses 382 and removes any unwanted clauses 384 to form and propose a best fit negotiated contract 390. Contract 390 is then transmitted to Party B, who can accept or choose to start over.

Figure 12:
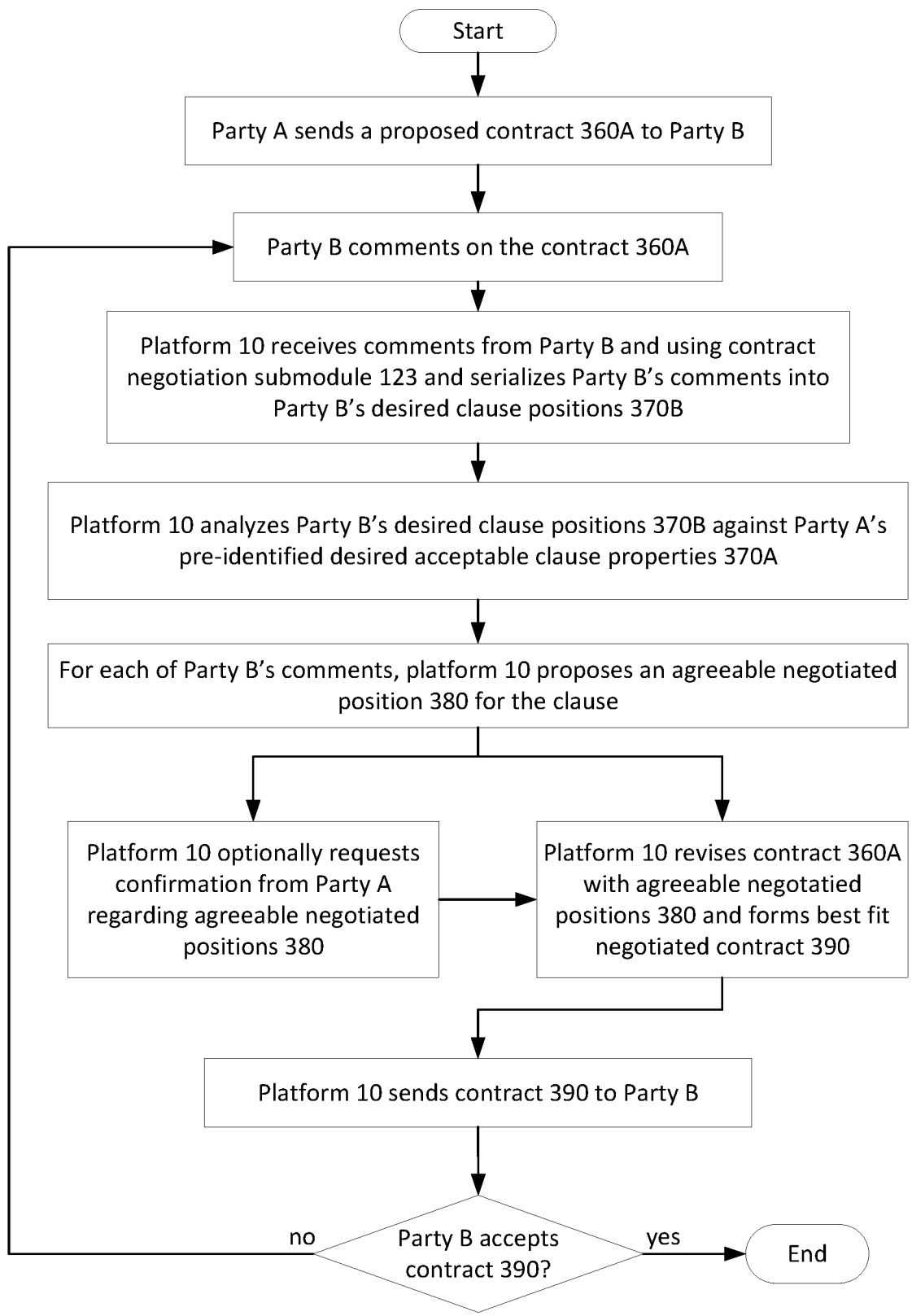
FIG. 12 s a flowchart illustrating a third scenario of two parties using the contract formation module of the present invention to negotiate and form a contract.

FIG. 12 illustrates another scenario falling within submodule 123 where a client, Party A, proposes a contract 360A to Party B. In response to Party A's proposal, Party B returns comments or a counteroffer. Party A submits the comments to platform 10 or they are directly submitted by Party B. Platform 10 serializes Party B's comments into its desired clause positions 370B and then analyzes them against Party A's pre-identified desired clause properties 370A. Analysis is performed according to the method described with clause analysis tool 315. For each of Party B's comments, platform 10 proposes an agreeable negotiated position 380 for the clause. Optionally, before revising Party A's proposed contract 360A with the agreeable negotiated positions 380, platform 10 can request confirmation for all or some of the agreeable negotiated positions. Platform 10 then revises contract 360A with the agreeable negotiated positions 380 and forms a proposed best fit negotiated contract 390. Contract 390 is transmitted to Party B who can accept contract 390 or submit new comments.

Figure 13:
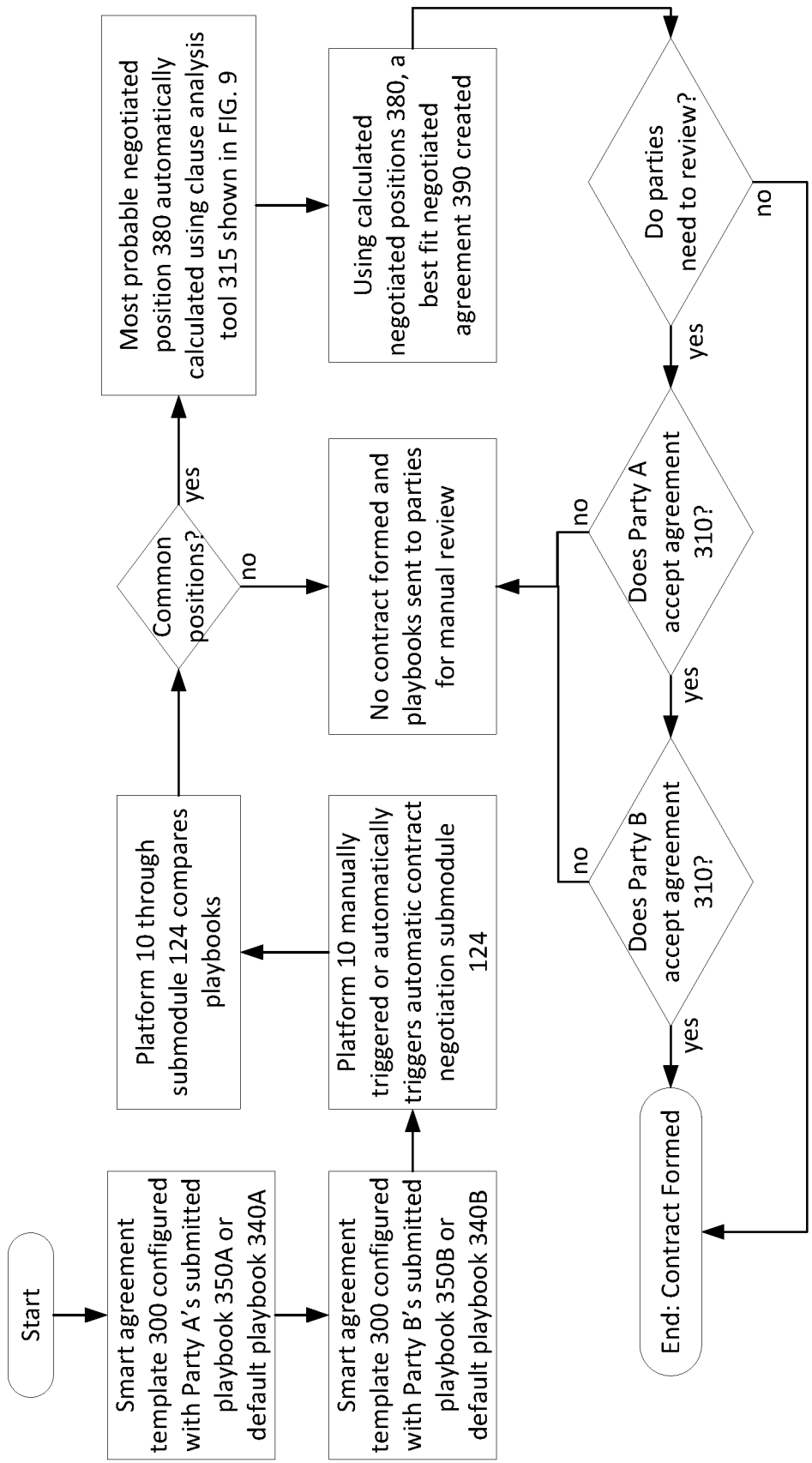
FIG. 13 s a flowchart illustrating a fourth scenario of two parties using the contract formation module of the present invention to automatically negotiate and form a contract based on competing playbooks.

FIG. 13 illustrates contract formation using automated contract negotiation submodule 124. Within automated contract negotiation submodule 124, a client or company can configure clauses in default industry contracts that it wants to change. Automated contract negotiation is possible based on the configuration of each company and the automated agreement negotiation technology. With the automated agreement negotiation technology (AAN), each company, or party to the contract, sets up their parameters for the smart contract, and then the software compares the parameters. When legal points and concepts match between the parameters, the agreement is recognized and a clause to which both companies can agree is suggested. By learning what is generally accepted, or using artificial intelligence, the accuracy increases regarding what will be acceptable to both companies. When the automated agreement negotiation technology cannot find common ground between the two companies and therefore cannot reach a negotiated outcome, then a request can be sent to the legal departments for the companies. The automated contract negotiation uses artificial intelligence and advanced algorithms designed to implement extensive legal knowledge.

As shown with FIG. 13, each client, Party A and Party B, completes the same smart agreement template 300 according to a default playbook 340 or a newly submitted playbook 350. For example, Party A completes template 300 according to its default playbook 340A and Party B complete template 300 according to its specialized playbook 350B. The playbooks can include specific terms or a set of acceptable terms for each clause in the template. Additionally, if the playbook relates to an industry specific template, then there are a finite set of terms available. If the playbook relates to a custom template, then the Party creating the template can set custom values. After both parties have submitted their parameters, platform 10 reviews the competing positions to see if there are common positions. If common positions are not present, then no contract is formed and the parties can choose to manually review. If common positions are present, then using clause analysis tool 315, a most probably negotiated position 380 is automatically calculated. Next, platform 10 revises template 300 with the negotiated positions 380 to create a best fit negotiated agreement 390. Optionally, once agreement 390 is created, it can be automatically accepted by the parties or it can be submitted for each party to manually accept. If submitted to the parties first, then both parties must agree to it before it is accepted. If either party rejects agreement 390, it can be sent to the parties for manual review.

Within the internal approval submodule 125, platform 10 allows companies to set up an internal approval routing to approve transactions. The approval routings can be automatically set up to seek approval based on the value of the transaction or the type of transaction. It is also possible to set up manual approval and to make approvals using a specific application.

The authorized signatory submodule 126 allows clients and their companies to ensure legal compliance such that only people authorized to enter into transactions and sign contracts do so. Clients can configure the submodule on an entity by entity basis and can specify and allow only authorized persons to confirm transactions, which ensure legal certainty about whether a transaction is binding on a company or individual. Optionally, the signatures can be set up as verified signatures based on information cross-referenced with the relevant company register or the signor can execute the agreement using public/private key cryptology and blockchain security. Additionally, the signatures can be set ups as "basic," for example when identified by email address, or "official digital identity," for example when identified by personal identification documents and requirements in the particular country or business.

With the intercompany company agreement submodule 127, platform 10 allows clients to create, sign, and manage intercompany agreements. Optionally, these can be standard agreements or agreements modified manually or using smart contracts as discussed above.

Figure 5:
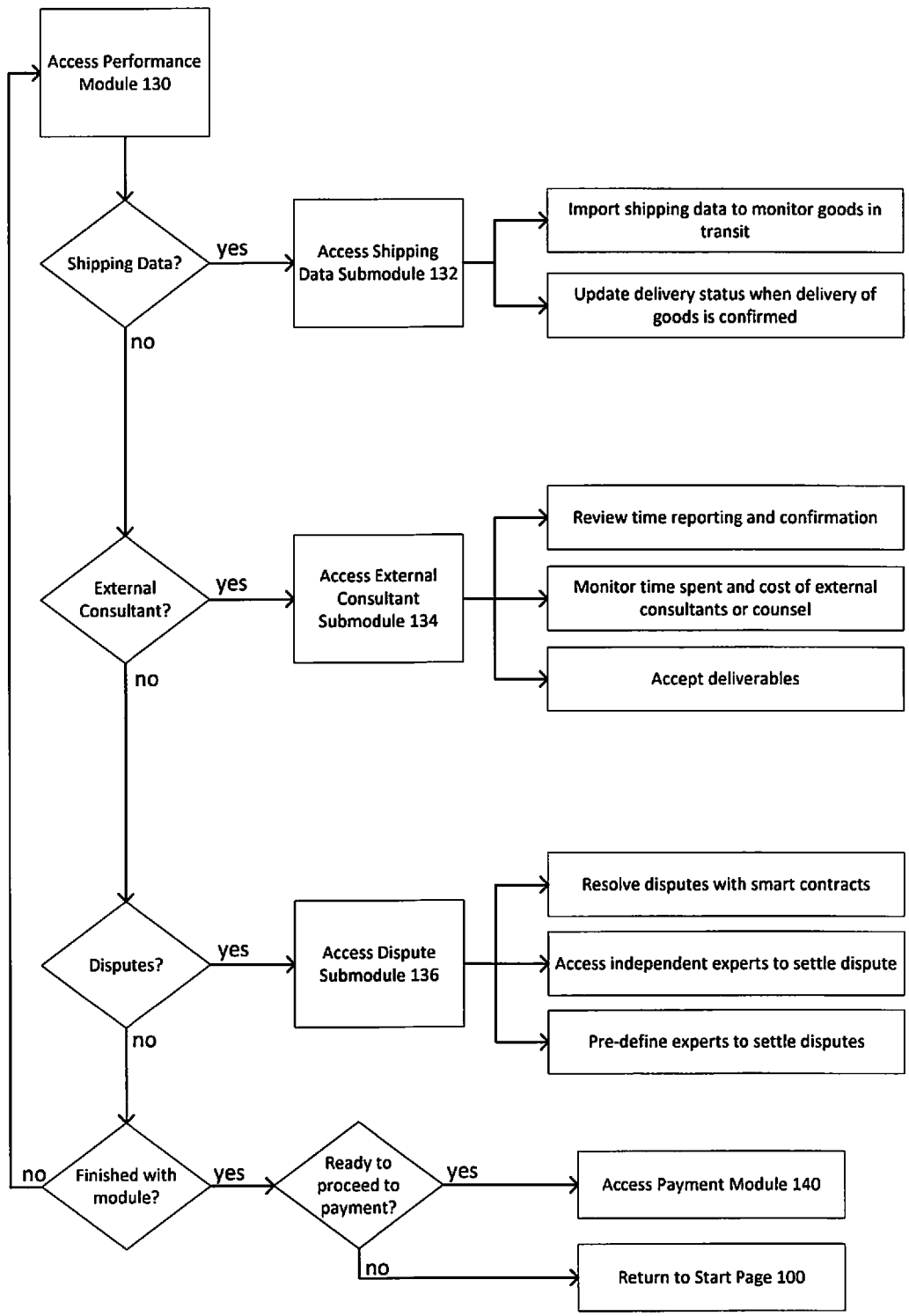
FIG. 5 is a flowchart of the performance module of the platform of the present invention.

FIG. 5 illustrates the features available in performance module 130. Preferably, performance module 130 includes several submodules including a shipping data for goods submodule 132, an external consultant submodule134, and a dispute submodule 136. Within shipping data for good submodule 132, shipping data can be imported to keep track of goods in transit, and the system can update when delivery is confirmed. External consultant submodule 134 is a specialized transaction submodule for time and cost reporting and confirmation where time spent and/or costs are tracked by external counsel or external consultants. External consultant submodule 134 also allows for external counsel or consultants to accept deliverables. Dispute submodule 136 handles disputes based on the applicable smart contract used and allows client to raise a dispute on platform 10 and to access independent experts to help settle the disputes.

Figure 6:
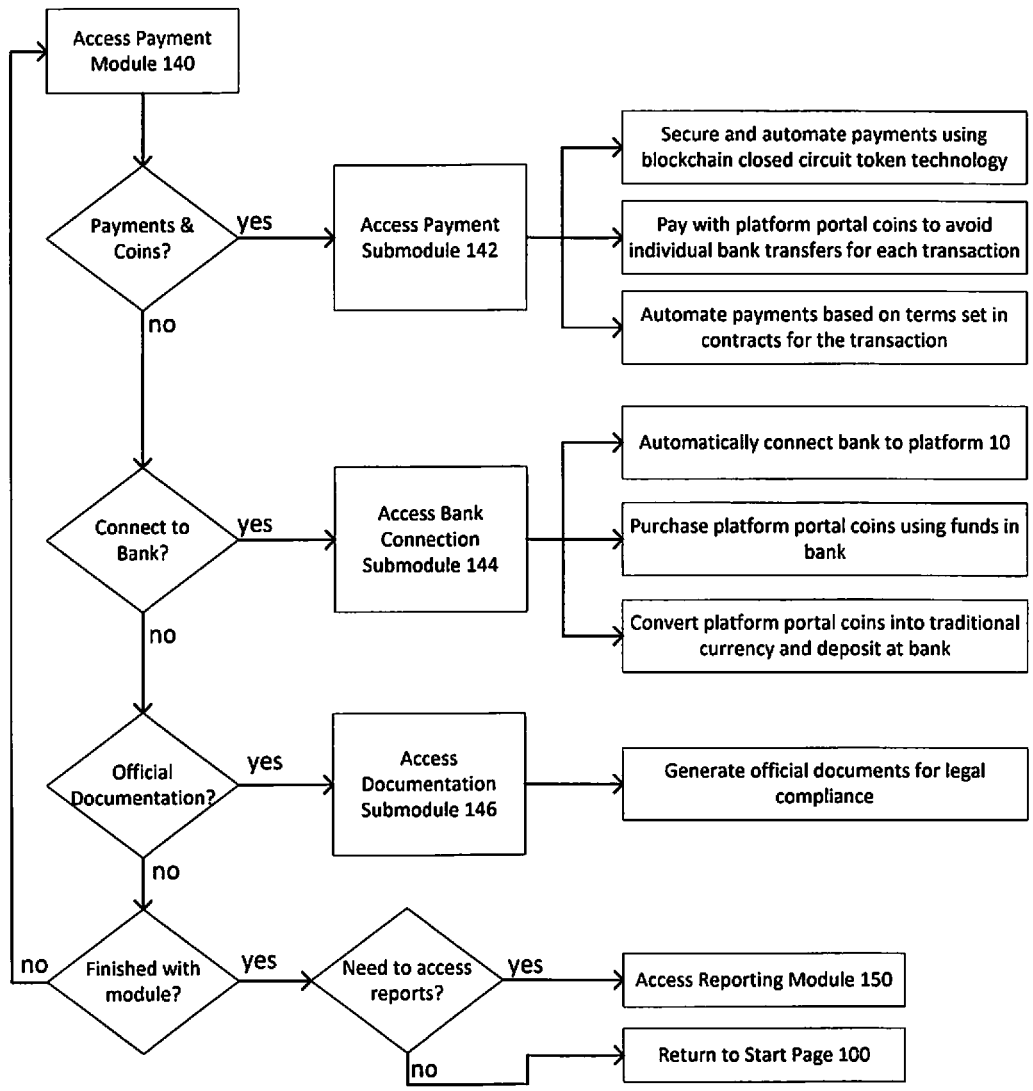
FIG. 6 is a flowchart of the payment module the platform of the present invention.
Figure 7:
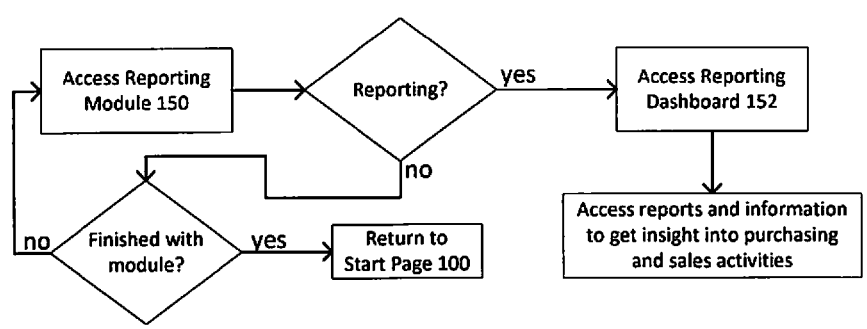
FIG. 7 is a flowchart of the reporting module the platform of the present invention.

FIG. 6 illustrates the features of an optional payment module 140. Payment module 140 includes a currency submodule 142, a bank connection submodule 144, and an official documentation submodule 146. With currency submodule 142, secure and automated payments can be enabled using blockchain closed circuit token technology. Cryptocurrency, such as platform portal coins, can be used to make payments, which avoids the need for individual bank transfers for each transaction made on platform 10. Clients can either hold the platform portal coins to use them for payment of other transactions or they can trade the platform portal coins for traditional currency at any time to enable cash flow management. Preferably, platform portal coins are backed by a bank consortium with strict financial conventions on withdrawals. By using platform portal coins, companies are protected from fraudulent transactions based on false or incorrect bank accounts, and there is no need to verify details. Additionally, payments can be automated based on the terms set out in the associated smart contract for the transactions. For example, for a sale of goods transaction, payment is automatically made thirty days from delivery confirmation.

Also within payment portal 140, using the connect to bank submodule 144 and documentation submodule 146, clients can automatically link their bank account to platform 10 to purchase platform payment coins or to convert platform payment coins to traditional currency, and clients can generate official documents that may be needed for legal compliance.

Reporting module 150 provides access to clients to a dashboard having options to select a variety of reports useful for gaining insight into company purchasing or selling activities.

Platform 10 can be offered for use by companies or individuals in a variety of ways and monetized in a variety of ways. One could charge companies and individuals a fee for each transaction or license the platform as a whole or only for access to advanced modules. One could also receive a commission for third party products and services sold within the platform, charge interest on money stored on a bank account that backs the cryptocurrency tokens, and/or sell data associated with the platform. For example, a platform provider could charge a fee for advanced industry smart contracts within the smart contracts submodule 122 of the contracting module 120. Alternatively, outside vendors could pay for access to platform 10 or provide a royalty, fee, or commission when their products or services are used. For example, law firms or legal knowledge companies could make templates available for purchase within the smart contracts submodule 122, and platform provider could collect a fee for each contract use. Similarly, dispute resolution professionals could pay a fee to the platform provider to be on a list or they could pay a commission to the platform provider each time their services are used to settle a dispute.

There are many advantages to using platform 10. It may be used by customers in industries having standard terms and transactions and by all types of customers when artificial intelligence and automatic negotiation features are enabled. Additionally, platform 10 can handle transactions within a particular country or internationally. Platform 10 also allows for centralized access and tracking of company data, transaction data, contracts, and shipping. By using platform 10, company administrators have fewer tasks and will no longer need to review supplier data or run compliance checks. Additionally, payments are automated, and a network of important agencies and businesses are linked for easy access, including government departments, banks, credit agencies, customs, professional advisory companies, and shipping companies.

While there has been illustrated and described what is at present considered to be the preferred embodiment of the present invention, it will be understood by those skilled in the art that various changes and modifications may be made and equivalents may be substituted for elements thereof without departing from the true scope of the invention disclosed, but that the invention will include all embodiments falling within the scope of the claims.

I claim:

1. A computer-implemented method comprising:

accessing, using one or more computing devices in a computing environment, a first proposed contract stored on storage associated with the computing environment, wherein the first contract belongs to a first client;

executing, using the one or more computing devices in the computing environment, simplification process on the first proposed contract that comprises serializing the first contract into a first set of clause positions;

accessing, using the one or more computing devices in the computing environment, a second proposed contract stored on storage associated with the computing environment, wherein the second contract belongs to a second client;

executing, using the one or more computing devices in the computing environment, a simplification process on the second proposed contract that comprises serializing the second contract into a second set of clause positions;

accessing, using the one or more computing devices in the computing environment, a clause library stored on storage associated with the computing device, wherein the clause library comprises a third set of clause positions;

executing, using the one or more computing devices in the computing environment, a reconciliation process that comprises comparing the first, second, and third clause positions to identify negotiable clause positions;

if all clauses are negotiable, then for each negotiable clause, without user interaction from the first and second clients and using the one or more computing devices in the computing environment, executing a negotiation process to determine each an agreeable position for each clause and adding the agreeable position to a fourth set of clause positions stored on the storage of the computing environment;

executing, using the one or more computing devices in the computing environment, a contract revision process that comprises modifying the first contract with the fourth set of clause positions to create a best negotiated contract, and storing the best negotiated contract on storage associated with the computing environment; and displaying, using the one or more computing devices in the computing environment, a notification on client computing devices for first and second clients, wherein the notification alerts first and second clients that a best negotiated contract has been created and has been stored on the computing environment.

2. The method of claim 1 wherein the simplification process applied to the first proposed contract further comprises ranking the clause positions within the first set of clause positions and wherein the simplification process applied to the second proposed contract further comprises ranking the clause positions within the second set of clause positions.

3. The computer-implemented method of claim 1 further comprising:

executing, before executing the contract revision process, without user interaction from the first and second clients and using the one or more computing devices in the computing environment, a first addition process to add to the fourth set of clause positions stored on the storage of the computing environment any additional clause positions that are required by the first party; and executing, before executing the contract revision process, without user interaction from the first and second clients and using the one or more computing devices in the computing environment, a second addition process to add to the fourth set of clause positions stored on the storage of the computing environment any additional clause positions that are required by the second party.

4. The computer-implemented method of claim 1 further comprising accessing, using one or more computing devices in a computing environment, a template stored on storage associated with the computing environment after accessing the first and second proposed contracts, wherein the first proposed contract comprises a first playbook of clause positions associated with the template and the second proposed contract comprises a second playbook of clause positions associated with the template.

5. The computer-implemented method of claim 4 wherein the third set of clause positions comprises clause positions associated with the template.

6. The computer-implemented method of claim 1 further comprising:

displaying to the second client through a user interface, using the one or more computing devices in the computing environment, a set of options relating to the first proposed contract after accessing the first proposed contract belonging to the first client;

recording, using the one or more computing devices in the computing environment, responses of the second client to the set of options relating to the first proposed contract; and storing, using the one or more computing devices in the computing environment, the recorded responses on storage associated with the computing environment, wherein the recorded response comprise the second proposed contract.

7. The computer-implemented method of claim 1 further comprising displaying, using the one or more computing devices in the computing environment, a prompt on client computing devices for first and second clients after executing the reconciliation process if the reconciliation process failed to identify all of the clause positions as negotiable, wherein the prompt requests that the first and second clients retrieve the first and second proposed contracts for manual review.

8. A computer-implemented method of forming contracts comprising:

retrieving, by a computer processor, a first proposed contract from a first client computing device associated with a first party;

retrieving, by a computer processor, a second proposed contract from a second client computing device associated with a second party;

simplifying, by a computer processor, the first proposed contract into a serialized first set of desired clause positions;

simplifying, by a computer processor, the second proposed contract into a serialized second set of desired clause positions;

retrieving, by a computer processor, a serialized third set of clause positions from a third connected computing device;

comparing, by a computer processor, the first, second, and third set of clause positions to identify negotiable clause positions;

determining for each clause position, by a computer processor, an agreeable position without interacting with the first or second party, and add agreeable clause position to a fourth set of agreeable clause positions if all clause positions are negotiable;

modifying, by a computer processor, the first contract with the fourth set of agreeable clause positions to create a best negotiated contract; and delivering, by a computer processor, the best negotiated contract to the first client computing device associated with the first party and to the second client computing device associated with the second party.

9. The computer-implemented method of claim 8 further comprising:

ranking, by a computer process, the clause positions within the first set of clause positions after simplifying the first proposed contract into a serialized first set of desired clause positions; and ranking, by a computer process, the clause positions within the second set of clause positions after simplifying the second proposed contract into a serialized second set of desired clause positions.

10. The computer-implemented method of claim 8 further comprising:

adding, by a computer process before modifying the first contract with the fourth set of agreeable clause positions, to the fourth set of clause positions stored on the storage of the computing environment any additional clause positions that are required by the first party; and adding, by a computer process before modifying the first contract with the fourth set of agreeable clause positions, to the fourth set of clause positions stored on the storage of the computing environment any additional clause positions that are required by the second party.

11. The computer-implemented method of claim 8 further comprising retrieving, by a computer process after retrieving the first and second proposed contracts, a template stored on storage associated with the computing environment, wherein the first proposed contract comprises a first playbook of clause positions associated with the template and the second proposed contract comprises a second playbook of clause positions associated with the template.

12. The computer-implemented method of claim 8 further comprising:

displaying to the second client through a user interface on the client computing device of the second client, by a computer process, a set of options relating to the first proposed contract after retrieving the first proposed contract from the first client;

recording, by a computer process, responses of the second client to the set of options relating to the first proposed contract; and storing, by a computer process, the recorded responses of the second client on the client computing device of the second client, wherein the recorded response comprise the second proposed contract.

13. The computer-implemented method of claim 8 further comprising notifying, by a computer process, the first and second clients that the first and second contracts required manual review if, after comparing the first, second, and third sets of clause positions, the comparison failed to identify all of the clause positions as negotiable.

14. A computer-implemented contract formation system comprising:

one or more memory devices; and one or more processing devices, wherein the one or more processing devices are configured to cause the system to:

access a first proposed contract from a first client computing device associated with a first party;

access a second proposed contract from a second client computing device associated with a second party;

simplify the first proposed contract into a serialized first set of desired clause positions;

simplify the second proposed contract into a serialized second set of desired clause positions;

access a serialized third set of clause positions from the system memory;

compare the first, second, and third set of clause positions to identify negotiable clause positions;

if all clause positions are negotiable, for each clause position, determine an agreeable position without interacting with the first or second party, and add agreeable clause position to a fourth set of agreeable clause positions;

modify the first contract with the fourth set of agreeable clause positions to create a best negotiated contract; and deliver the best negotiated contract to the computing device associated with the first party and to the computing device associated with the second party.

15. The system of claim 14 wherein the one or more processing devices are further configured to cause the system to:

rank the clause positions within the first set of clause positions after simplifying the first proposed contract into a serialized first set of desired clause positions; and rank the clause positions within the second set of clause positions after simplifying the second proposed contract into a serialized second set of desired clause positions.

16. The system of claim 14 wherein the one or more processing devices are further configured to cause the system to:

add to the fourth set of clause positions any additional clause positions that are required by the first party before modifying the first contract with the fourth set of agreeable clause positions; and add to the fourth set of clause positions any additional clause positions that are required by the second party before modifying the first contract with the fourth set of agreeable clause positions.

17. The system of claim 14 wherein the one or more processing devices are further configured to cause the system to access a template stored on the one or memory devices after retrieving the first and second contracts from the first and second client computing devices, wherein the first contract comprises a first playbook of clause positions associated with the template and the second contract comprises a second playbook of clause positions associated with the template.

18. The system of claim 17 wherein the third set of clause positions comprises clause positions associated with the template.

19. The system of claim 14 wherein the one or more processing devices are further configured to:

display to the second client through a user interface a set of options relating to the first proposed contract after accessing the first proposed contract belonging to the first client; and record responses of the second client to the set of options relating to the first proposed contract, wherein the recorded response comprise the second proposed contract.

20. The system of claim 14 wherein the one or more processing devices are further configured to notify the first and second clients that the first and second contracts required manual review if, after comparing the first, second, and third sets of clause positions, the comparison failed to identify all of the clause positions as negotiable.

* * * * *